Patented Mar. 7, 1944

2,343,415

UNITED STATES PATENT OFFICE 2,343,415

PEST CONTROL

Frank H. Kaufert, St. Paul, Minn., assignor to E. I. du Pont de Nemours & Company, Wilmington, Del., a corporation of Delaware No Drawing. Application July 3, 1940,
Serial No. 343,775

3 Claims. (Cl. 167—30)

This invention relates to pest control and is particularly directed to methods and compositions for preventing or arresting infestations of insects, fungi, bacteria, protozoa, molds and various other organisms economically harmful to man which commonly infest organic matter, whether plant or animal or of plant or animal origin, either in the natural, fabricated or synthetic state; which methods and compositions distinguish from the processes and compositions known heretofore in the use of chlorinated 6-nitrotoluene.

More particularly this invention relates to the control of noxious organisms which infest soil, such as termites, eelworms, fungi and the like, and to soil poisoning or disinfecting compositions containing as an essential active ingredient a chlorinated 6-nitrotoluene having an equivalent molecular weight less than 200.

Termites infest the greater portion of the United States and other warm or temperate places, and because of their peculiar habit of living in subterranean retreats from which they infest wooden buildings and constructions without overtly giving any indication of their presence, create problems of control which are not generally encountered with other types of pests. Because the presence of termites is seldom discovered until substantial damage has been done the best means of control has been by the use of preventive measures, and various allegedly termite-proof constructions have been proposed and are in common use. However the control is effected, whether by use of termite shields or other means, or by eradication or by prevention, it is now generally recognized that the control is more effective and reliable if the surrounding terrain from which termites could possibly infest the building or construction is treated with a suitable soil poison.

A substance toxic to termites and incorporated in a vehicle suitable for impregnating the soil may act to kill the termites or at least to prevent them from infesting the building or construction by diffusing into the subterranean passages and retreats of the termites through its volatility, water-solubility and like properties. Water-soluble soil poisons such as sodium arsenite, while highly effective, suffer disadvantages in that they tend to leach out during weathering and also tend to pollute water supplies. Water-soluble compounds, and the water solubility need only be small, are more likely also to cause injury to ornamental plants. Water-insoluble compounds such as ortho-dichlorobenzene and the chloropentanes are more commonly employed but also suffer disadvantages in that because of high volatility they do not afford protection for a sufficient length of time. Also, many of the known soil poisons such as beta-naphthol and diphenylamine seem to undergo deterioration and become inactivated in the soil. Other materials such as the chlorinated phenols and nitro phenols are not only hazardous to use but frequently suffer the disadvantages of both the soluble and insoluble type in view of the solubilizing effect of alkali in the soil.

The ideal toxicant for a soil poison for termites is one which is water-insoluble and substantially inert to the constituents of the soil and the atmosphere, which is not so volatile as to become ineffective in a relatively short time, and which is so highly toxic to termites that notwithstanding its slight volatility it is effective in relatively small concentrations. The ideal toxicant additionally should be easily applied, that is, it should be a liquid or highly soluble in cheap solvents, or it should be easily emulsified. Also, it should be safe to handle in the sense of not creating fire hazards or causing injury to human beings or to ornamental plants and shrubbery. Above all, it should be cheap and readily available.

Now it has been found that the chlorinated nitrotoluenes have properties which make them eminently suited for the control of certain types of pests, particularly termites and fungi, and that their cheapness and availability coupled with their toxicological and physical properties combine to make them suited to the control of a wide variety of pestiferous organisms.

The chlorinated nitrotoluenes to which this invention is particularly directed are obtainable by the chlorination of 6-nitrotoluene which, when carried out according to methods well known to those skilled in the art, yield both mono and polychlorinated derivatives. If the monochlorination is practiced the product is a mixture of two isomers, namely, 2-chloro-6-nitrotoluene and 4-chloro-6-nitrotoluene, which may be utilized as such or separated by fractional crystallization or other methods known to those skilled in the art. In soil poisons for termites, however, it is desirable that the equivalent molecular weight of the compound should not exceed about 200, since otherwise the products are not sufficiently volatile. In other cases, as where the product is used as a preservative and disinfectant for wood, wallboard, rope, fabric, leather, fish-net, paper, paint, regenerated cellulosic products, etc., to prevent attack by fungi, insects, bacteria and other harmful organisms, a product of relatively high molecular weight is more desirable. The degree of chlorination and nitration can be adjusted as desired to give a product most suited for the particular application.

The comparative effectiveness of the chlorinated nitrotoluenes as soil poisons for termites is shown in the following example:

EXAMPLE 1

A good grade of dry garden soil is carefully mixed with a measured quantity of the chemical tested, and placed in jars containing paper or other cellulosic material to act as food for the termites. Sufficient water is added to moisten the mixture. From 50 to 100 worker termites are then added to each test container and the condition of the termites is determined 24 hours later. Additional termites are added at intervals and observations made over an extended period.

The effectiveness of the test compound is expressed as follows:

| Rating | Description |
| --- | --- |
| 10 | Termites all dead—little penetration into soil. |
| 8 | Termites all dead—deep penetration into soil. |
| 6 | Majority (50%+) termites dead—little penetration into soil. |
| 4 | Majority (50%+) termites dead—deep penetration into soil. |
| 2 | Majority termites alive (90%+)—little penetration into soil. |
| 0 | Majority termites alive (90%+)—deep penetration into soil. |

The results obtained in three series of tests, one of which was conducted for six months, another of which for four months, and the third for one month, are given in the following table:

*Series I (After six months)*

| Compound | Concentration of chemical in soil | | | | |
| --- | --- | --- | --- | --- | --- |
| | 1:200 | 1:400 | 1:800 | 1:1600 | 1:3200 |
| 2-chloro-6-nitrotoluene | 10 | 10 | 10 | 6 | 0 |
| Orthodichlorobenzene | 0 | 0 | 0 | 0 | 0 |
| Dichloropentane | 0 | 0 | 0 | 0 | 0 |
| Alpha-nitronaphthalene | 8 | 0 | 0 | 0 | 0 |
| Pentachlorophenol | 4 | 0 | 0 | 0 | 0 |
| Diphenylamine | | 0 | | | 0 |

*Series II—(After four months)*

| Compound | Concentration of chemical in soil | | | | |
| --- | --- | --- | --- | --- | --- |
| | 1:200 | 1:400 | 1:800 | 1:1600 | 1:3200 |
| 2-chloro-6-nitrotoluene | 10 | 10 | 10 | 10 | 6 |
| 6-nitrotrichlorotoluene | | 8 | | 4 | 0 |
| 6-chloro-2,3-dinitrotoluene | | 8 | 0 | 0 | 0 |
| Orthodichlorobenzene | 8 | 0 | 0 | 0 | |
| Dichloropentane | 4 | 0 | 0 | 0 | 0 |
| Alpha-nitronaphthalene | 10 | 8 | 0 | 0 | |

*Series III (After one month)*

| Compound | Concentration of chemical in soil | | | | |
| --- | --- | --- | --- | --- | --- |
| | 1:200 | 1:400 | 1:800 | 1:1600 | 1:3200 |
| 2-chloro-6-nitrotoluene | 10 | 10 | 10 | 10 | 10 |
| Monochlorinated 6-nitrotoluene (mixed 2- and 4-chloro isomers) | 10 | 10 | 10 | 10 | 10 |
| 6-nitrotrichlorotoluene | 10 | 10 | 6 | 2 | 0 |
| Polychlorinated 6-nitrotoluene | 10 | 10 | 10 | 6 | 0 |
| 2-chloro-3,5-dinitro-6-hydroxytoluene | | 10 | 10 | 2 | 0 |
| Orthodichlorobenzene | 10 | 8 | 2 | | |
| Beta-naphthol | 10 | 2 | 0 | | |
| Diphenylamine | 10 | 2 | | 0 | |

It is indicated in the above data that the monochloro-mononitro derivatives are the most suitable for soil poisons. Suitable compositions for applying these materials to soil may be prepared as follows:

EXAMPLE 2

A concentrated emulsion suitable for preparing dilute spray emulsions is prepared by blending together 22½ parts of 2-chloro-6-nitrotoluene, 2½ parts ortho-dichlorobenzene and 25 parts straw paraffin oil of viscosity 65 sec. Saybolt, to form a clear solution from which the 2-chloro-6-nitrotoluene does not separate at normal temperatures, and emulsifying this oil solution in 49 parts of a casein-borax solution prepared from 3 parts of borax and 6 parts of casein for each hundred parts of water. One part of sodium lauryl sulfate is also included and the emulsion is effected simply by passing all the components through a colloid mill. The product is a stable, highly concentrated emulsion which is sufficiently fluid to pour easily and which may be diluted with large quantities of water without breaking. It should be applied to the soil in dilution of 1 to 2 parts of the concentrate per 2 parts of the water. The amount required must be gauged by the experience of the operator and in accordance with the comparative data given in the foregoing table.

The ortho-dichlorobenzene functions to reduce the melting point of the 2-chloro-6-nitrotoluene and to increase its solubility in the oil. If it is not used, more oil is required and the concentration of the 2-chloro-6-nitrotoluene in the dispersed phase is correspondingly reduced. The ortho-dichlorobenzene may be used in amounts up to 50 per cent of the amount of 2-chloro-6-nitrotoluene, and the oil preferably should not constitute more than about 50 per cent of the dispersed phase. In place of the paraffin oil any cheap solvent may be employed. Preferably it is relatively non-volatile. The mineral oils are most desirable and may be used from mineral spirits up to a mineral oil having a viscosity of 110 sec. Saybolt. Other emulsifying agents may be used in place of the solubilized casein and other wetting agents in place of the sodium lauryl sulfate.

Another suitable composition can be prepared according to the following example:

EXAMPLE 3

A composition similar to that described in Example 2 is prepared by blending 25 parts of monochlorinated 6-nitrotoluene in 25 parts of straw paraffin oil of viscosity of 65 sec. Saybolt and emulsifying the solution thus obtained in the manner described in Example 2. The monochlorinated 6-nitrotoluene is a mixture of the 2- and 4-chloro isomers. About 60% of the mixture is 2-chloro-6-nitrotoluene. o-Dichlorobenzene is not used in this formulation because the presence of the 4-chloro-6-nitrotoluene has essentially the same effect in reducing the melting point and in increasing the miscibility of the product in the paraffin oil. The 6:4 ratio is determined by the chlorination procedure and may vary considerably. Also, it may be augmented by adding additional quantities of 2-chloro-6-nitrotoluene without detrimentally affecting the stability of the emulsion.

Another suitable composition is prepared according to the following example:

EXAMPLE 4

A composition which is self-dispersible is prepared by blending together 85 parts of monochlorinated 6-nitrotoluene and 15 parts of piperidine oleate. The product is a clear solution from which dilute emulsions may be easily prepared if precaution is taken first to prepare a concentrated emulsion. It is suitable to pour the product into an equal quantity of water, stir well and dilute with water as desired. One to 2 parts of the concentrate to each 10 parts of water provides an emulsion suitable for spraying termite infested soil.

In place of the monochlorinated 6-nitrotoluene there can be substituted 2-chloro-6-nitrotoluene containing ortho-dichlorobenzene as described in Example 2. In either case paraffin oil or like solvent, as described in Example 2, may be used to reduce the concentration of chlorinated nitrotoluene in the dispersed phase. Other emulsifying agents may be used, but unlike Examples 2 and 3 these must be of the oil-miscible or oil-soluble types, or must be used in conjunction with a blending agent to solubilize them in the concentrate. An example of the latter type is N-diethyl-N-cyclohexylamine lauryl sulfate, which becomes oil-miscible when blended with a higher alcohol such as oleyl alcohol and other water-insoluble normally liquid alcohols. Other amine salts of the higher alcohol sulfates, as described in U. S. Patent 2,139,256, may be similarly employed. Other oil-soluble emulsifying agents include the sulfonated mineral oils and sulfonated vegetable oils such as Turkey-red oil.

While I have described my invention with particular reference to soil poisons for termites, it is to be understood that in its broader aspects the invention is not so limited but extends to and includes the use of chlorinated nitrotoluenes in the preservation of various products such as wood, wallboard, rope, fabric, leather, fish nets, paper, paint, regenerated cellulosic products, etc., from attack of fungi, insects, bacteria and like harmful organisms, particular applications of which are set forth in my copending application, Serial No. 343,820 filed of even date hereof.

I claim:

1. A termite soil poisoning and disinfecting composition containing as an essential active ingredient 2-chloro-6-nitrotoluene and a carrier therefor.

2. A pest control composition comprising 2-chloro-6-nitrotoluene, ortho-dichlorobenzene and a mineral oil in proportions to give a stable solution at normal temperatures.

3. The method of protecting wood and wood products from attack by termites which comprises impregnating the terrain surrounding the wood with 2-chloro-6-nitrotoluene.

FRANK H. KAUFERT.